United States Patent
Barbieri et al.

(10) Patent No.: US 9,609,536 B2
(45) Date of Patent: Mar. 28, 2017

(54) MEASUREMENT OF RECEIVED POWER AND RECEIVED QUALITY IN A WIRELESS COMMUNICATION NETWORK

(75) Inventors: Alan Barbieri, San Diego, CA (US); Tingfang Ji, San Diego, CA (US); Aleksandar Damnjanovic, Del Mar, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/085,367

(22) Filed: Apr. 12, 2011

(65) Prior Publication Data

US 2011/0286346 A1    Nov. 24, 2011

Related U.S. Application Data

(60) Provisional application No. 61/323,826, filed on Apr. 13, 2010, provisional application No. 61/389,067, filed on Oct. 1, 2010.

(51) Int. Cl.
*H04W 28/04* (2009.01)
*H04W 24/10* (2009.01)
(Continued)

(52) U.S. Cl.
CPC .......... *H04W 24/10* (2013.01); *H04B 17/318* (2015.01); *H04B 17/327* (2015.01); *H04W 16/14* (2013.01)

(58) Field of Classification Search
USPC ................................. 370/252, 331, 328–329
See application file for complete search history.

(56) References Cited

U.S. PATENT DOCUMENTS

| 5,471,670 A | 11/1995 | Hess et al. |
| 6,714,775 B1 | 3/2004 | Miller |
| (Continued) | | |

FOREIGN PATENT DOCUMENTS

| CN | 1753397 A | 3/2006 |
| CN | 1960195 A | 5/2007 |
| (Continued) | | |

OTHER PUBLICATIONS

3GPP TR 25.814 V1.2.0, 3rd Generation Partnership Project, Technical Specification Group Radio Access Network, Physical Layer Aspects for Evolved UTRA (Release 7), Internet Citation, Feb. 1, 2006 (Feb. 1, 2006), XP002400401, Retrieved from the Internet: URL: http://www.3gpp.org/ftp/Specs/html - info/25814.htm [retrieved on Sep. 26, 2006].

(Continued)

*Primary Examiner* — Omar Ghowrwal
*Assistant Examiner* — Angel Brockman
(74) *Attorney, Agent, or Firm* — Ashish L. Patel

(57) ABSTRACT

Certain aspects of the present disclosure provide techniques and apparatuses for wireless communications. According to certain aspects, a set of protected resources, allocated to a base station of a first cell, that are protected by restricting transmissions of a second cell is determined and received power of a first reference signal from the base station in the set of resources is measured. According to certain aspects, a subset of one or more neighbor base stations that have reduced interference in a set of protected resources is determined and received power measurements for the subset of neighbor cells is excluded when calculating receive signal quality measurements for the subframe.

46 Claims, 8 Drawing Sheets

(51) Int. Cl.
  *H04B 17/318* (2015.01)
  *H04B 17/327* (2015.01)
  *H04W 16/14* (2009.01)

(56) References Cited

U.S. PATENT DOCUMENTS

| | | | |
|---|---|---|---|
| 6,888,805 B2 | 5/2005 | Bender et al. | |
| 6,952,589 B1* | 10/2005 | Mantha | 455/501 |
| 7,020,110 B2 | 3/2006 | Walton et al. | |
| 7,280,467 B2 | 10/2007 | Smee et al. | |
| 8,259,603 B2* | 9/2012 | Kuroda et al. | 370/252 |
| 8,265,033 B2* | 9/2012 | Gunnarsson et al. | 370/331 |
| 2002/0085641 A1 | 7/2002 | Baum | |
| 2002/0103001 A1 | 8/2002 | Weissman | |
| 2003/0016174 A1 | 1/2003 | Anderson | |
| 2003/0045318 A1 | 3/2003 | Subrahmanya | |
| 2003/0174676 A1 | 9/2003 | Willenegger et al. | |
| 2004/0116122 A1 | 6/2004 | Zeira et al. | |
| 2004/0146093 A1 | 7/2004 | Olson et al. | |
| 2004/0180658 A1* | 9/2004 | Uchida et al. | 455/436 |
| 2005/0036441 A1 | 2/2005 | Laroia et al. | |
| 2005/0096062 A1 | 5/2005 | Ji et al. | |
| 2005/0099973 A1* | 5/2005 | Qiu et al. | 370/328 |
| 2005/0254555 A1 | 11/2005 | Teague et al. | |
| 2006/0018297 A1 | 1/2006 | Gorokhov | |
| 2006/0223461 A1 | 10/2006 | Laroia et al. | |
| 2007/0010198 A1 | 1/2007 | McKay, Sr. | |
| 2007/0042784 A1 | 2/2007 | Anderson et al. | |
| 2007/0058595 A1 | 3/2007 | Classon et al. | |
| 2007/0060050 A1 | 3/2007 | Lee et al. | |
| 2007/0104151 A1 | 5/2007 | Papasakellariou et al. | |
| 2007/0104164 A1 | 5/2007 | Laroia et al. | |
| 2007/0121484 A1* | 5/2007 | Kim et al. | 370/208 |
| 2007/0177501 A1 | 8/2007 | Papasakellariou | |
| 2007/0298798 A1 | 12/2007 | Hagerman et al. | |
| 2008/0025240 A1 | 1/2008 | Casaccia et al. | |
| 2008/0037409 A1 | 2/2008 | Ogawa et al. | |
| 2008/0080629 A1 | 4/2008 | Munzner | |
| 2008/0081626 A1 | 4/2008 | Choi et al. | |
| 2008/0101506 A1 | 5/2008 | Jayaraman et al. | |
| 2008/0130593 A1 | 6/2008 | Scheinert et al. | |
| 2008/0146154 A1 | 6/2008 | Claussen et al. | |
| 2008/0171546 A1* | 7/2008 | Hyon et al. | 455/434 |
| 2008/0232504 A1 | 9/2008 | Ma et al. | |
| 2008/0240054 A1 | 10/2008 | Sandhu et al. | |
| 2008/0253300 A1* | 10/2008 | Wakabayashi et al. | 370/252 |
| 2008/0253484 A1 | 10/2008 | Kakura et al. | |
| 2008/0279296 A1 | 11/2008 | Roh et al. | |
| 2008/0318579 A1 | 12/2008 | McCoy et al. | |
| 2009/0047971 A1 | 2/2009 | Fu | |
| 2009/0069043 A1* | 3/2009 | Roh et al. | 455/522 |
| 2009/0154580 A1 | 6/2009 | Ahn et al. | |
| 2009/0185483 A1 | 7/2009 | McBeath et al. | |
| 2009/0316659 A1 | 12/2009 | Lindoff et al. | |
| 2009/0325590 A1 | 12/2009 | Liu et al. | |
| 2010/0008282 A1 | 1/2010 | Bhattad et al. | |
| 2010/0034076 A1 | 2/2010 | Kishiyama et al. | |
| 2010/0081388 A1* | 4/2010 | Han et al. | 455/63.1 |
| 2010/0118706 A1 | 5/2010 | Parkvall et al. | |
| 2010/0128690 A1* | 5/2010 | McBeath et al. | 370/329 |
| 2010/0220666 A1* | 9/2010 | Imamura et al. | 370/329 |
| 2010/0272032 A1* | 10/2010 | Sayana et al. | 370/329 |
| 2011/0069742 A1 | 3/2011 | Narayan et al. | |
| 2011/0136496 A1* | 6/2011 | Klang et al. | 455/452.1 |
| 2013/0242959 A1 | 9/2013 | Bhattad et al. | |
| 2013/0250855 A1 | 9/2013 | Bhattad | |

FOREIGN PATENT DOCUMENTS

| | | |
|---|---|---|
| CN | 101018220 A | 8/2007 |
| CN | 101056285 A | 10/2007 |
| CN | 101159530 A | 4/2008 |
| CN | 101197803 A | 6/2008 |
| EP | 1739850 A2 | 1/2007 |
| EP | 1976317 A1 | 10/2008 |
| JP | 2003209879 A | 7/2003 |
| JP | 2006517759 | 7/2006 |
| JP | 2007189619 A | 7/2007 |
| JP | 2007300384 A | 11/2007 |
| JP | 2008118310 A | 5/2008 |
| KR | 20050030508 A | 3/2005 |
| RU | 2315433 C1 | 1/2008 |
| TW | 200812282 A | 3/2008 |
| WO | 0232003 A1 | 4/2002 |
| WO | 02078371 | 10/2002 |
| WO | 03001834 A1 | 1/2003 |
| WO | 2005032004 A1 | 4/2005 |
| WO | 2007024895 A2 | 3/2007 |
| WO | 2007102684 A1 | 9/2007 |
| WO | 2009099810 | 8/2009 |
| WO | 2009099811 A1 | 8/2009 |
| WO | 2009117658 A1 | 9/2009 |
| WO | 2009120934 A1 | 10/2009 |
| WO | 2010006285 A2 | 1/2010 |

OTHER PUBLICATIONS

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), 3GPP-Standards, 2500 Wilson Boulevard, Suite 300, Arlington, Virginia 22201 USA, Sep. 1, 2006 (Sep. 1, 2006), XP040282759 see 9.3.2.4 (p. 100) t o 9.3.3.1 (p. 102).

3GPP TS 36.300 V8.4.0, "Evolved Universal Terrestrial Radio Access (E-UTRA) and Evolved Universal Terrestrial Radio Access Network", Overall description, Stage 2, Mar. 2008, http://www.3gpp.org/ftp/tsg_ran/WG2_RL2/Specifications/200803_draft_specs_after_RAN_39/draft_36300-840.zip.

3rd Generation Partnership Project; Technical Specification Group Radio Access Network; Evolved Universal Terrestrial Radio Access (E-Utra); Physical layer; Measurements (Release 9 ),3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V9.1.0, Mar. 30, 2010 (Mar. 30, 2010), pp. 1-14, XP050402151.

Huawei: "MBSFN Subframe Allocation Signaling" 3GPP Draft; R2-081693, 3rd Generation Partnership Project (3GPP), Mobile Competence Centre ; 650, Route Des Lucioles ; F-06921 Sophia-Antipolis Cedex ; France, vol. RAN WG2, no. Shenzhen, China; Mar. 25, 2008, Mar. 25, 2008 (Mar. 25, 2008), XP050139407 [retrieved on Mar. 25, 2008].

Huawei: "MBSFN Subframe Indication" 3GPP Draft; R1-071690, 3rd Generation Partnership Project (3GPP), Mobile Competence Centre ; 650, Route Des Lucioles ; F-06921 Sophia-Antipolis Cedex ; France, vol. RAN WG1, no. St . Julian; Apr. 3, 2007, Apr. 3, 2007 (Apr. 3, 2007), XP050105613 [retrieved on Apr. 3, 2007].

International Search Report and Written Opinion—PCT/US2011/032322, International Search Authority—European Patent Office—Aug. 12, 2011.

Qualcomm Europe: "Advantages of synchronous network operation for LTE-A", 3GPP TSG-RAN WG1 #53bis R1-082555, Jun. 30-Jul. 4, 2008.

Ritt, et al., "TP on uplink inter-cell interference cancellation" 3GPP Draft; R1-060418, 3rd Generation Partnership Project (3GPP), Mobile Competence Centre ; 650, Route Des Lucioles ; F-06921 Sophia-Antipolis Cedex ; France, vol. RAN WG1, no. Denver, USA; Feb. 9, 2006, Feb. 9, 2006 (Feb. 9, 2006), XP050101362 [retrieved on Feb. 9, 2006] the whole document.

Ritt, Huawei, CATT "Combining Inter-cell-interference co-ordination/avoidance with cancellation in uplink and TP", R1-060419, 3GPP TSG-RAN WG1 LTE Ad Hoc Meeting Helsinki, Finland, Jan. 23-25, 2006.

Samsung: "Discussions on CSI-RS for LTE-Advanced", 3GPP Draft; R1-093375 CSI RS Designs in LTE-A, 3rd Generation Partnership Project (3GPP), Mobile Competence Centre; 650,

(56) References Cited

OTHER PUBLICATIONS

Route Des Lucioles; F-06921 Sophia-Antipolis Cedex; France, no. Shenzhen, China; Aug. 19, 2009, Aug. 19, 2009 (Aug. 19, 2009), XP050351673.
Taiwan Search Report—TW100112864—TIPO—Aug. 1, 2013.
Huawei: "Physical layer technologies for LTE-Advanced", 3GPP TSG RAN WG1#53, R1-081838, May 9, 2008.
Nortel, "Transparent relay for LTE-A FDD", R1-082517, RAN1 #53bis, Jun. 2008.
Qualcomm Europe: "Initial Evaluation of Relay Performance", 3GPP TSG-RAN WG1 #55bis R1-090370, Jan. 12, 2009, URL, http://www.3gpp.org/ftp/tsg_ran/wg1_r11/TSGR1_55b/Docs/R1-090370.zip.
Qualcomm Europe: "Operation of Relays in LIE-A", 3GPP TSG-RAN WG1 #55bis R1-090369, Jan. 12, 2009, URL, http://www.3gpp.org/ftp/tsg_ran/wg1_r11/TSGR1_55b/Docs/R1-090369.zip.
Samsung: "Future 3GPP Radio Technologies for LIE-Advanced", 3GPP RAN Working Group 1 #53 R1-081722, May 5, 2008, pp. 9-18, URL, http://www.3gpp. org/ftp/tsg_ran/wg1_r11/TSGR1_53/Docs/R1-081722.zip.
ZTE: "Redundant signaling overhead on MSAP", 3GPP TSG RAN WG2 #64Bis R2-090317, Jan. 12, 2009, URL, http://www.3gpp.org/ftp/tsg_ran/wg2_r12/TSGR2_64bis/Docs/R2-090317.zip.
NTT Docomo et al., "Scrambling Code in E-UTRA Downlink", 3GPP Draft; R1-062712 DL Scrambling Code, 3rd Generation Partnership Project (3GPP), Mobile Competence Centre ; 650, Route Des Lucioles ; F-06921 Sophia-Antipolis Cedex ; France, vol. RAN WGI, no. Seoul, Korea; Oct. 4, 2006, Oct. 4, 2006 (Oct. 4, 2006), XP050103200, [retrieved on Oct. 4, 2006].
Drieberg M., et al., "An improved distributed dynamic channel assignment scheme for dense WLANs," 6th International Conference on Information, Communications & Signal Processing, 2007, pp. 1-5.
Qualcomm Europe: "New Interference Scenarios in LTE-Advanced" 3GPP Draft; R1-082556, 3rd Generation Partnership Project (3GPP), Mobile Competence Centre; 650, Route Des Lucioles; F-06921 Sophia-Antipolis Cedex; France, vol. RAN WG1, no. Warsaw, Poland; Jun. 25, 2008, Jun. 25, 2008 (Jun. 25, 2008), XP050110817 [retrieved on Jun. 25, 2008] p. 1, paragraph 2.2—p. 2.

* cited by examiner

MEASUREMENT OF RECEIVED POWER AND RECEIVED QUALITY IN A WIRELESS COMMUNICATION NETWORK

CLAIM OF PRIORITY UNDER 35 U.S.C. §119

This application claims priority to U.S. Provisional Application Ser. No. 61/323,826, entitled, "MEASUREMENT OF RECEIVED POWER AND RECEIVED QUALITY IN A WIRELESS COMMUNICATION NETWORK", filed on Apr. 13, 2010, and to U.S. Provisional Application Ser. No. 61/389,067, entitled, "MEASUREMENT OF RECEIVED POWER AND RECEIVED QUALITY IN A WIRELESS COMMUNICATION NETWORK", filed on Oct. 1, 2010, both of which are expressly incorporated by reference herein in their entirety.

BACKGROUND

I. Field

The present disclosure relates generally to communication, and more specifically to techniques for making measurements in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communication. The method generally includes determining a set of protected resources, allocated to a base station of a first cell, that are protected by restricting transmissions of a second cell and measuring received power of a first reference signal from the base station in the set of resources.

Certain aspects of the present disclosure provide a method for wireless communication. The method generally includes determining a subset of neighbor base stations that have restricted transmissions in a set of protected resources allocated to a base station of a first cell and excluding received power measurements for the subset of neighbor cells when calculating receive signal quality measurements for the subframe.

Certain aspects of the present disclosure provide an apparatus for wireless communication. The apparatus generally includes means for determining a set of protected resources, allocated to a base station of a first cell, that are protected by restricting transmissions of a second cell and means for measuring received power of a first reference signal from the base station in the set of resources.

Certain aspects of the present disclosure provide an apparatus for wireless communication. The apparatus generally includes means for determining a subset of neighbor base stations that have restricted transmissions in a set of protected resources allocated to a base station of a first cell and means for excluding received power measurements for the subset of neighbor cells when calculating receive signal quality measurements for the subframe.

Certain aspects of the present disclosure provide an apparatus for wireless communication. The apparatus generally includes at least one processor configured to determine a set of protected resources, allocated to a base station of a first cell, that are protected by restricting transmissions of a second cell and measure received power of a first reference signal from the base station in the set of resources; and a memory coupled with the at least one processor.

Certain aspects of the present disclosure provide an apparatus for wireless communication. The apparatus generally includes at least one processor configured to determine a subset of neighbor base stations that have restricted transmissions in a set of protected resources allocated to a base station of a first cell and exclude received power measurements for the subset of neighbor cells when calculating receive signal quality measurements for the subframe; and a memory coupled with the at least one processor.

A computer program product comprising a computer readable medium with instructions stored thereon, the instructions executable by one or more processors for determining a set of protected resources, allocated to a base station of a first cell, that are protected by restricting transmissions of a second cell and measuring received power of a first reference signal from the base station in the set of resources.

A computer program product comprising a computer readable medium with instructions stored thereon, the instructions executable by one or more processors for determining a subset of neighbor base stations that have restricted transmissions in a set of protected resources allocated to a base station of a first cell and excluding received power measurements for the subset of neighbor cells when calculating receive signal quality measurements for the subframe.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
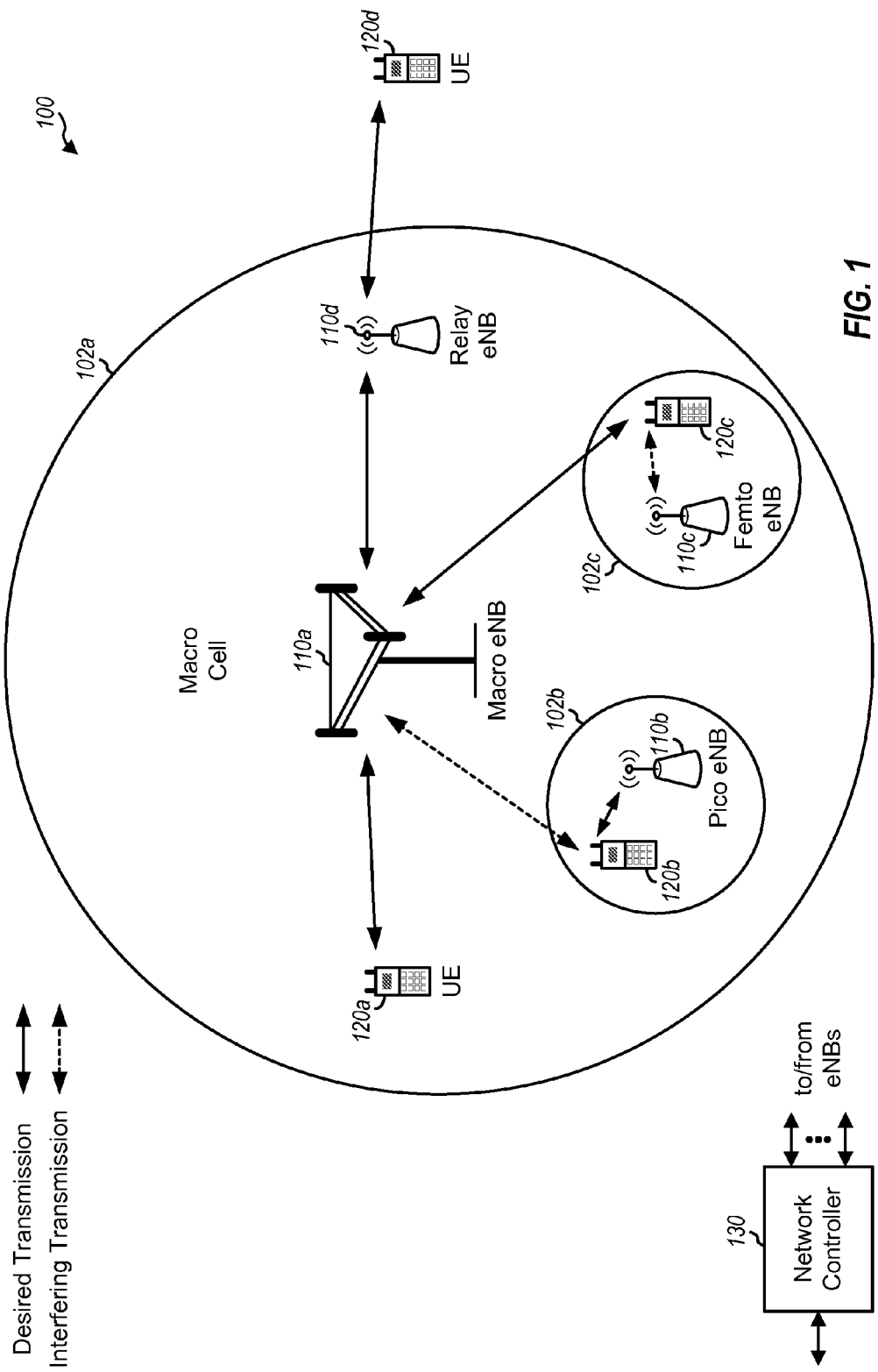
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
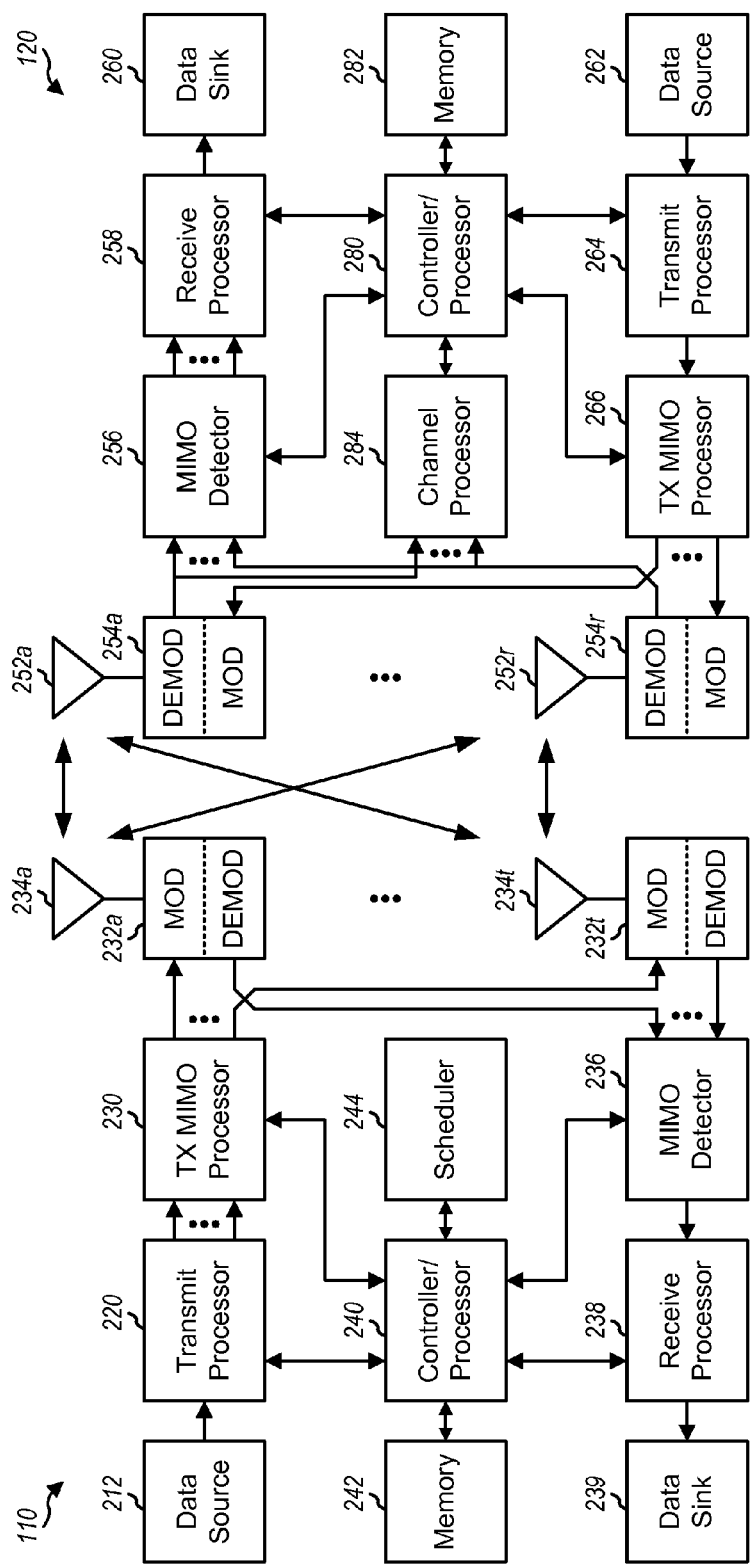
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct process 800 in FIG. 8 and/or other processes for the techniques described herein. Processor 280 and/or other processors and modules at UE 120 may perform or direct process 700 in FIG. 7 and/or other processes for the techniques described herein. Memories 242 and 282 may store data and program codes for base station 110 and UE 120, respectively. A scheduler 244 may schedule UEs for data transmission on the downlink and/or uplink.

Figure 3:
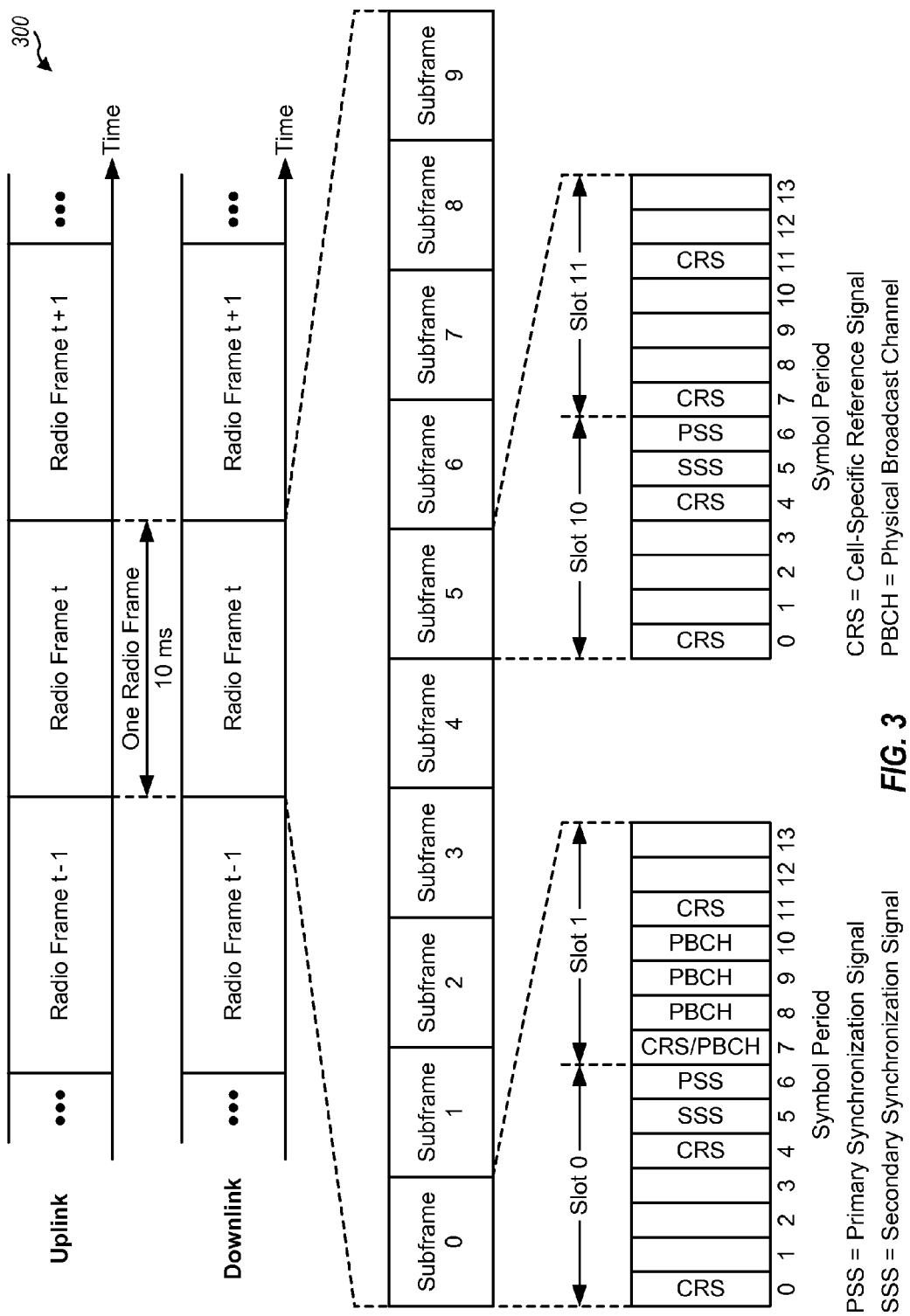
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
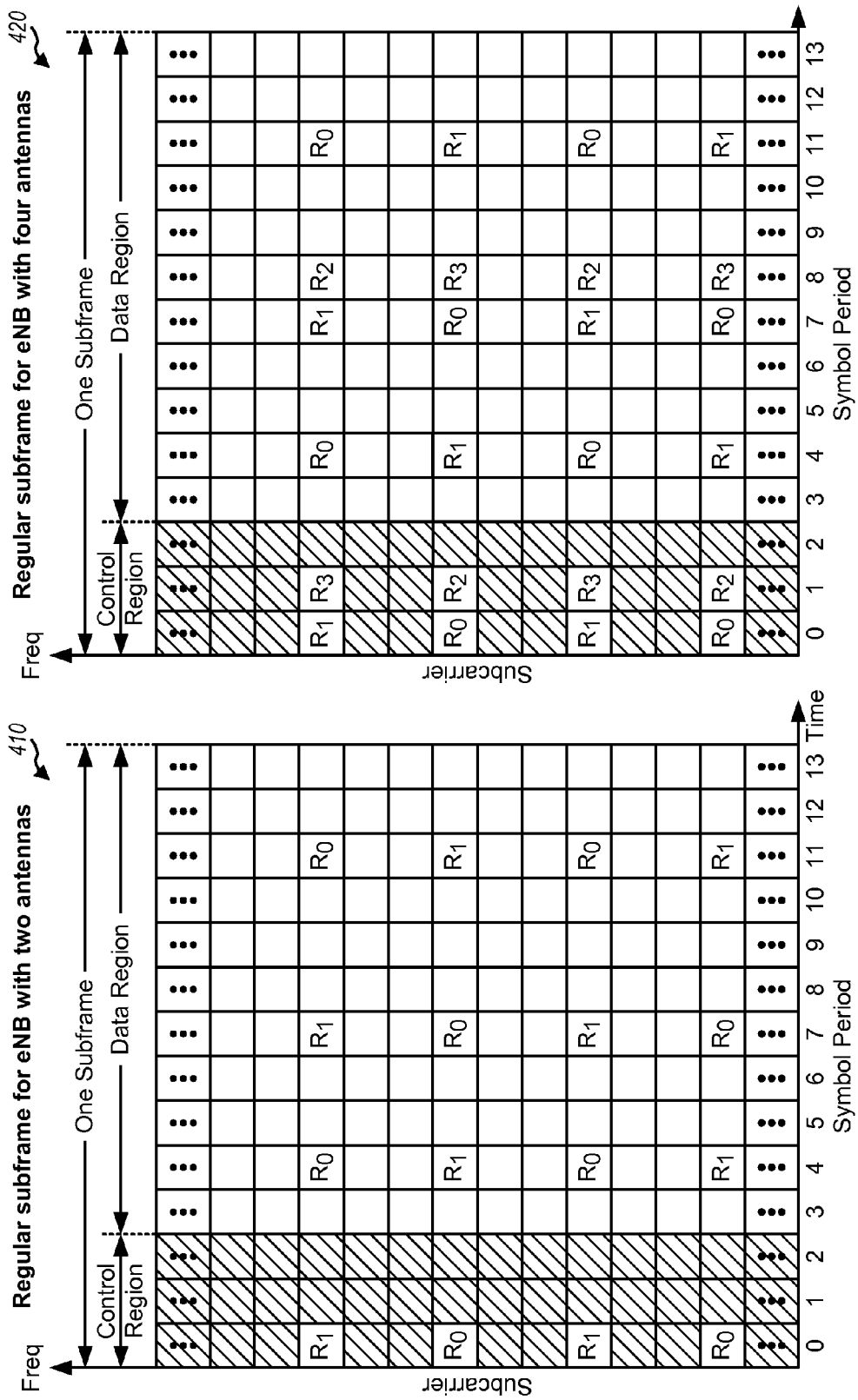
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

The UE may operate in a dominant interference scenario in which the UE may observe high interference from one or more interfering eNBs.

Figure 5:
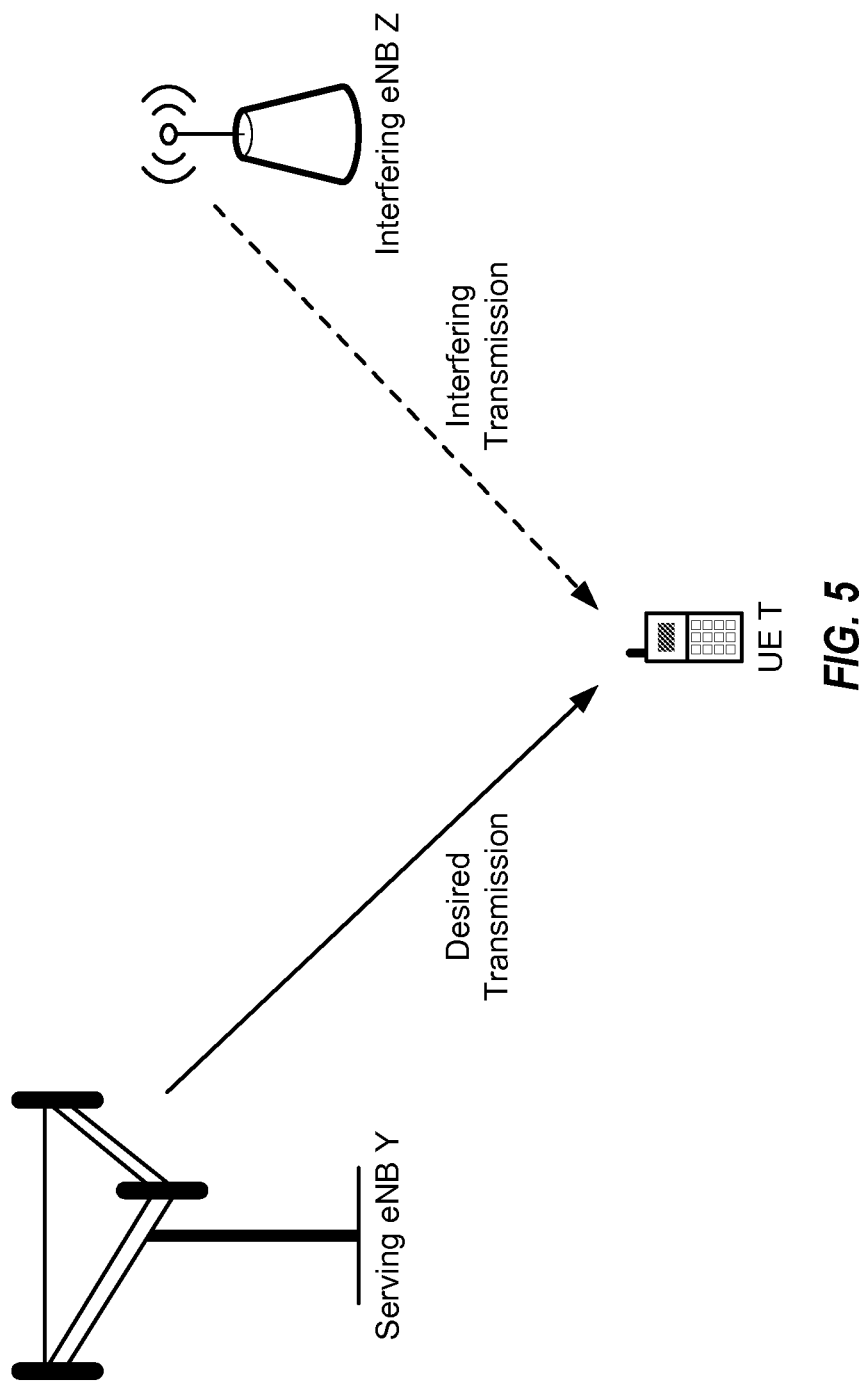
FIG. 5 shows an exemplary dominant reference scenario, in accordance with aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
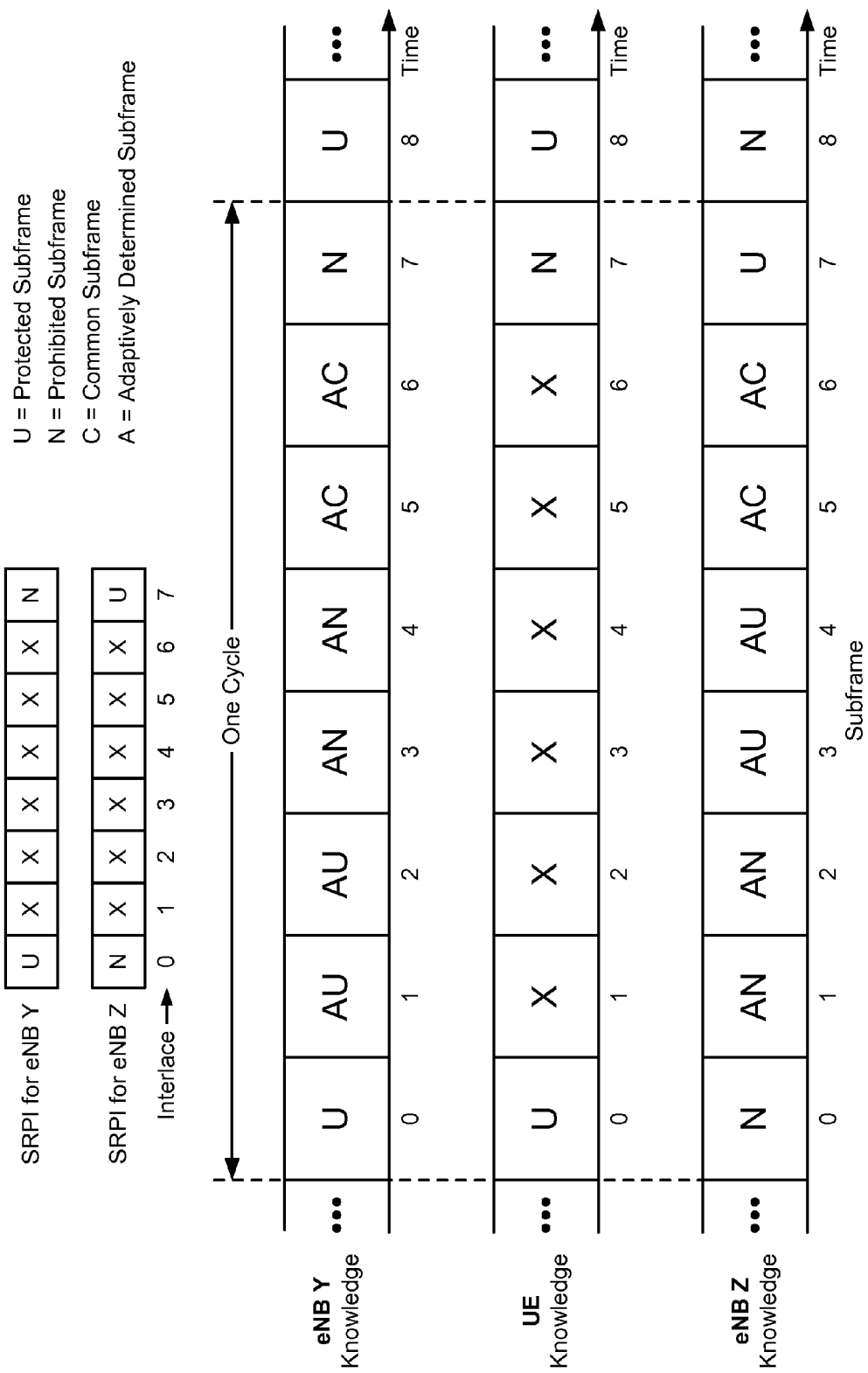
FIG. 6 shows an example partition of resources.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes)

may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

RSRP AND RSRQ MEASUREMENT

In an aspect, a UE may take one or more measurements based on a received signal, such as received power and received quality, by using its knowledge of U subframes for a target eNB and N subframes for interfering eNBs. An accurate measurement of received quality may be obtained with (i) an accurate measurement of received power of the target eNB at the UE and (ii) an accurate measurement of total received power at the UE. According to certain aspects, the UE may be able to obtain a more accurate received power measurement and a more accurate total received power measurement by using its knowledge of the U and N subframes.

While subframe-based partitioning is described in detail, those skilled in the art will recognize that the techniques described herein may be applied with any type of resource partitioning that results in protected resources. Such protected resources may, for example, comprise subbands or resource blocks in which transmissions in a neighboring cell are prohibited or restricted, resulting in no or reduced interference from interfering base stations (eNBs).

Table 1 lists a set of measurements that may be made by the UE. The UE may measure RSRP and RSSI and then computed RSRQ based on RSRP and RSSI. The UE may then determine CQI based on RSRQ.

TABLE 2

| Measurement | Acronym | Description |
| --- | --- | --- |
| Reference Signal Received Power | RSRP | Received power of a reference signal of a target eNB/cell at a UE. |
| Received Signal Strength Indicator | RSSI | Total received power at the UE. |
| Reference Signal Received Quality | RSRQ | Received quality of the reference signal of the target eNB/cell at the UE. |

The UE may make measurements in U subframes of the target eNB and determine CQI for the U subframes, which may have reduced or no interference from interfering eNBs. The U subframes may be selected first by the target eNB for data transmission to the UE since the CQI for these subframes may likely be higher due to protection from the interfering eNBs. A CQI for a U subframe may be referred to as a "clean" CQI to emphasize that it is measured over a subframe in which dominant interfering eNBs do not transmit data. The UE may receive the SRPI for the target eNB and can then identify the U subframes of the target eNB based on the SRPI. Alternatively, the UE may be informed of U subframes in which to make measurements.

The target eNB may transmit CRS and data in its U subframes. As described above, these U subframes for a service eNB may correspond to N subframes of one or more interfering eNBs. Each interfering eNB may also transmit CRS (but not data) in its N subframes. Each eNB may transmit its CRS on a set of evenly spaced subcarriers that may be determined based on its cell ID.

According to certain aspects, the UE may measure RSRP in a U subframe of the target eNB. The UE may measure RSRP based on the CRS from the target eNB in the U subframe. The CRS from the target eNB would observe no interference due to data from an interfering eNB having an N subframe corresponding to this U subframe. However, the CRS from the target eNB may or may not observe interference due to the CRS from the interfering eNB, which may transmit its CRS in its N subframe. CRS collision would occur when the target eNB and the interfering eNB transmit their CRSs on the same set of subcarriers. The UE may obtain the cell ID of each eNB based on the PSS and SSS transmitted by that eNB and may then determine whether there is CRS collision based on the cell IDs of the target eNB and the interfering eNB.

According to certain aspects, the UE may perform interference cancellation (IC) if there is collision between the CRS of the target eNB and the CRS of the interfering eNB. According to this aspect, the UE may estimate the interference due to the CRS of the interfering eNB and may cancel the estimated interference from a received signal at the UE to obtain an interference-canceled signal. The UE may then measure RSRP based on the CRS of the target eNB in the interference-canceled signal. The UE may obtain a more accurate RSRP measurement by canceling the interference due to the CRS of the interfering eNB when CRS collision occurs. In another aspect, the UE may measure RSRP without performing interference cancellation even if CRS collision occurs.

According to certain aspects, the UE may measure RSSI in a U subframe of the target eNB. The UE may measure the total received power of resource elements used by the target eNB to transmit its CRS. The total received power may include interference from other eNBs, thermal noise, etc.

According to certain aspects, the UE may estimate and exclude received power of the CRS of an interfering eNB that will not transmit data in the U subframe of the target eNB. The UE can determine that the interfering eNB will not transmit data in the U subframe if the SRPI for the interfering eNB indicates that the U subframe of the target eNB corresponds to an N subframe of the interfering eNB. The UE may then exclude the received power of the CRS of the interfering eNB from the total received power. The UE may obtain a more accurate RSSI measurement by excluding the received power of the CRS of the interfering eNB. The interfering eNB would not transmit data in the U subframe and hence would not contribute to the total received power on the resources used to transmit data by the target eNB.

According to certain aspects, the UE may compute RSRQ for the target eNB as follows:

$$RSRQ = \frac{N_{RB} * RSRP \text{ of Target } eNB}{RSSI(\text{in } U \text{ Subframe}) - RSRP \text{ of Interfering } eNB} \qquad \text{Eq (1)}$$

where $N_{RB}$ is the number of resource blocks used for RSSI measurement.

The UE may measure the RSRP and RSSI of the target eNB in the U subframe. The UE may also measure the RSRP of each interfering eNB having an N subframe corresponding to the U subframe of the target eNB. The RSRP of each interfering eNB may be indicative of interference due to the CRS of the interfering eNB. As shown in equation (1), the RSRP of each interfering eNB may be measured and subtracted from the RSSI to obtain a modified RSSI, which may be a more accurate measurement of the total interference and noise observed by the UE in the U subframe. The RSRQ may then be computed as a ratio of the RSRP of the target eNB to the modified RSSI. This RSRQ may be a more accurate measurement of received quality at the UE for the target eNB in the U subframe.

In general, for RSRQ measurement, the UE may subtract the received power or energy of interfering eNBs for which the subframes used for measurement are N subframes. The UE may determine the N subframes of the interfering eNBs based on the SRPI of these eNBs. The interfering eNBs may transmit the CRS but not data in their N subframes. Hence, the effects of the CRS of the interfering eNBs may be estimated and removed for both the RSRP measurement for the target eNB and the RSSI measurement. The RSRQ computed as shown in equation (1) may capture protection stemming from TDM resource partitioning.

Table 3 provides a short description for RSRP in accordance with one aspect.

TABLE 3

| | RSRP Description |
|---|---|
| Definition | Reference signal received power (RSRP) is defined as a linear average over power contributions (in [W]) of resource elements that carry cell-specific reference signals within a considered measurement frequency bandwidth. If the SRPI of a cell under measurement is known at the UE, then only protected subframes (namely, those marked "U" in the SRPI of the cell under measurement) will be used for RSRP measurement. For RSRP determination, the cell-specific reference signals $R_0$ according to [4] will be used. If the UE can reliably detect that $R_1$ is available, it may use $R_1$ in addition to $R_0$ to determine RSRP. The reference point for RSRP will be an antenna connector of the UE. If receiver diversity is in use by the UE, then the reported value will not be lower than the corresponding RSRP of any of the individual diversity branches. |
| Applicable for | RRC_IDLE intra-frequency, RRC_IDLE inter-frequency, RRC_CONNECTED intra-frequency, and RRC_CONNECTED inter-frequency. |

Table 4 provides a short description for RSSI in accordance with one aspect.

TABLE 4

| | RSSI Description |
|---|---|
| Definition | E-UTRA Carrier Received Signal Strength Indicator (RSSI) comprises a linear average of the total received power (in [W]) observed only in OFDM symbols containing reference symbols for antenna port 0, in the measurement bandwidth, over $N_{RB}$ number of resource blocks by the UE from all sources, including co-channel serving and non-serving cells, adjacent channel interference, thermal noise etc., but excluding from the measurement the reference signal energy coming from cells whose SRPI is known by the UE and for whom the measurement subframe is marked "N". |
| Applicable for | RRC_CONNECTED intra-frequency, and RRC_CONNECTED inter-frequency. |

Table 5 provides a short description for RSRQ in accordance with one aspect.

TABLE 5

| | RSRQ Description |
|---|---|
| Definition | Reference Signal Received Quality (RSRQ) is defined as a ratio $N_{RB} \times$ RSRP/(E-UTRA carrier RSSI), where $N_{RB}$ is the number of resource blocks of the E-UTRA carrier RSSI measurement bandwidth. The measurements in the numerator and denominator are made over the same set of resource blocks and subframes, namely RSSI measurement will use the same resource blocks and subframes used for RSRP estimation. The reference point for RSRQ will be an antenna connector of the UE. If receiver diversity is in use by the UE, then the reported value will not be lower than the corresponding RSRQ of any of the individual diversity branches. |
| Applicable for | RRC_CONNECTED intra-frequency, and RRC_CONNECTED inter-frequency. |

In general, it may be desirable to obtain an accurate measurement of received quality on resources used to transmit data (or data resources) at the UE in order to obtain good link adaptation performance. However, the UE may be able to make measurements only on resources used to transmit the CRS (or CRS resources). The received quality of the CRS resources may be used as an estimate of the received quality of the data resources. However, there may be discrepancy between the received quality of the CRS resources and the received quality of the data resources due to different interference observed on the CRS resources and the data resources. For example, an interfering eNB may transmit on the CRS resources but not on the data resources. The discrepancy may be accounted for by estimating and removing interference on the CRS resources by using information on resource partitioning for the target and interfering eNBs, as described above. After removing the effects of the interference, the received quality of the CRS resources may more closely match the received quality of the data resources.

Figures 7, 8:
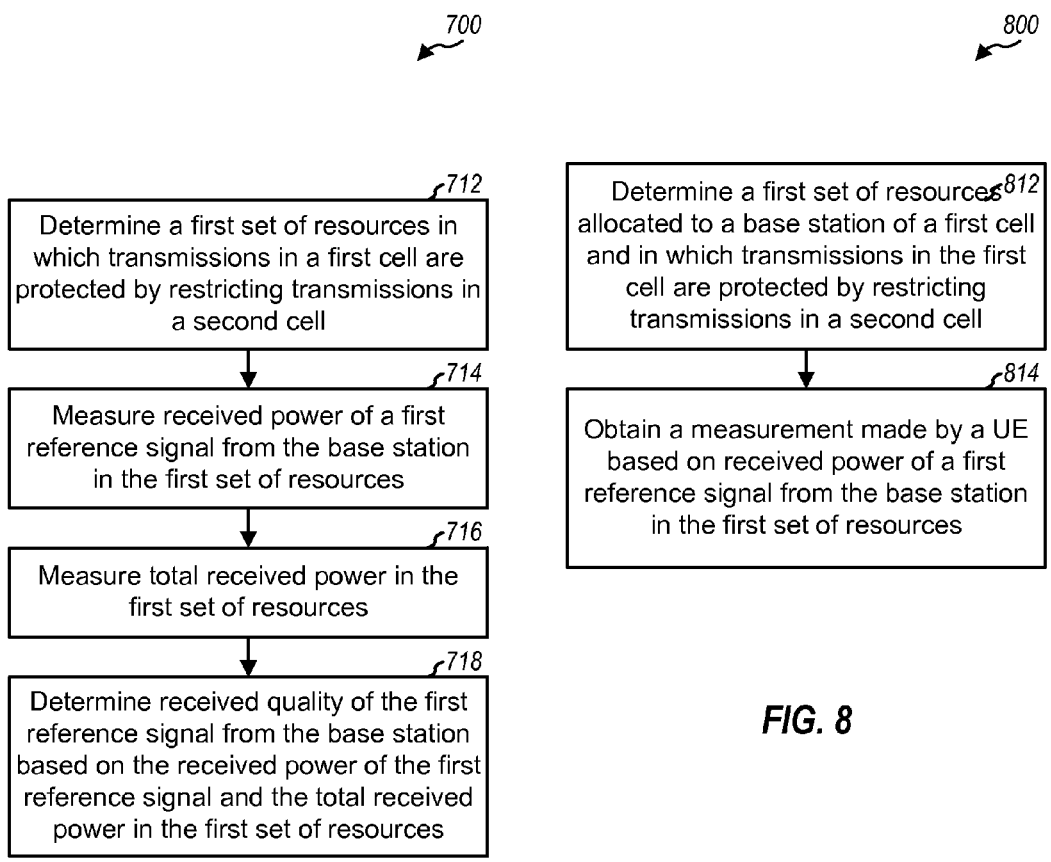
FIG. 7 illustrates example operations that may be performed by a UE, in accordance with certain aspects of the present disclosure.
FIG. 8 illustrates example operations that may be performed by a BS, in accordance with certain aspects of the present disclosure.

FIG. 7 shows example operations 700 for making measurement of received power and received quality. Operations 700 may be performed by a UE (as described below) or by some other entity.

At 712, the UE may determine a first set of resources in which transmissions in a first cell (e.g., a serving cell) are protected by restricting transmissions in at least a second cell. For example, the first set of resources may comprises a subframe that is designated as a U subframe for the serving cell and designated as an N subframe for (potentially interfering) neighbor cells.

At 714, the UE may measure received power of a first reference signal from the base station in the first set of resources. For example, the UE may determine RSRP of the base station based on the received power of the first reference signal transmitted in a protected (U) subframe.

According to certain aspects, the UE may perform interference cancellation for the RSRP. The UE may identify an interfering base station prohibited from transmitting data in the subframe allocated to the base station. The UE may estimate interference due to a second reference signal from the interfering base station in the subframe. The UE may subtract or cancel the estimated interference from a received signal to obtain an interference-canceled signal. The UE may then measure the received power of the first reference signal based on the interference-canceled signal. The UE may determine whether the first reference signal collides with the second reference signal and may estimate and cancel the interference due to the second reference signal if collision is detected.

At 716, the UE may measure total received power in the first set of resources. At 718, the UE may then determine received quality of the first reference signal (RSRQ) from the base station based on the received power of the first reference signal and the total received power in the first set of resources. For example, the UE may determine RSRQ of the base station based on the received quality of CRS sent in the first set of resources and the total received power in a protected subframe.

According to certain aspects, the UE may remove extraneous received power from the total received power. The UE may estimate received power of the second reference signal from the interfering base station in the subframe and may subtract the received power of the second reference signal from the total received power in the subframe to obtain modified total received power. The UE may then determine the received quality of the first reference signal based on the modified total received power, e.g., as shown in Equation (1) above.

According to certain aspects, the UE may receive SRPI for the base station and may identify the subframe allocated to the base station based on this SRPI. According to certain aspects, the UE may receive SRPI for the interfering base station and may determine that the interfering base station is prohibited from transmitting data in the subframe allocated to the base station based on this SRPI. The subframe may be semi-statically allocated to the base station via resource partitioning for the base station and the at least one interfering base station.

FIG. 8 example operations 800 for receiving measurements (taken according to the operations 700 of FIG. 7). The operations 800 may be performed by a base station/eNB (as described below) or by some other entity.

At 812, a base station of a first cell may determine a first set of resources in which transmissions in the first cell are protected by restricting transmissions in at least a second cell (e.g., a U subframe). At 814, the base station may obtain a measurement made by a UE based on received power of a first reference signal sent from the base station in the first set of resources.

According to certain aspects, the measurement may comprise RSRP of the base station. The RSRP may be used for various purposes such as to select a serving base station for the UE. The received power of the first reference signal may be measured by the UE after estimating and canceling interference due to a second reference signal from an interfering base station in the subframe.

In another design, the measurement may comprise RSRQ of the base station. The RSRQ may be used for various purposes such as to select a modulation and coding scheme for sending data to the UE. The RSRQ may be made based on the received power of the first reference signal and total received power at the UE in the subframe allocated to the base station. The total received power may exclude received power of the second reference signal from the interfering base station, which may improve the accuracy of the RSRQ.

According to certain aspects, the base station may send SRPI for the base station. The SRPI may convey the subframe allocated to the base station. The subframe may be semi-statically allocated to the base station via resource partitioning for the base station and the at least one interfering base station.

According to certain aspects, RSRQ definitions may vary depending on UE release and capability. UEs not capable of interference cancellation (Non-IC UEs) may not change the RSRQ definition (e.g., may use conventional definitions). So called enhanced non-IC UEs may modify the received signal strength indicator RSSI. The enhanced non-IC UEs may modify the RSSI, for example, by removing selected interfering cell CRS power from the RSSI computation. For example, non-colliding cell-specific CRS may be removed from the RSSI computation, while colliding RS may be kept in the computation. According to certain aspects UEs capable of performing interference cancellation (IC UEs), may remove the CRS component of interfering cells from the RSSI computation.

According to certain aspects, eNBs may define the RSRP/RSRQ thresholds. The RSRP/RSRQ thresholds as defined by the eNBs may depend on which definition is used for computing and measuring the RSSI. RSRP/RSRQ thresholds may be used for a variety of purposes including defining events and computing various parameters, such as Q-rx-LevMin.

According to certain aspects, a UE may peel off interference from some of the neighbor cells when computing RSSI. For example, the UE may peel off interference through interference cancellation of cell-specific reference signals (CRS-IC). A UE may also peel of interference by removing corresponding RSRP from the RSSI computation.

The UE may determine which cells to peel off through a number of methods. In one embodiment, the UE uses the SRPI-based approach. The UE may also blindly determine which cells should be peeled off. For example, the UE may determine the strongest neighboring cells that are CSG, or cells for which IC provide sufficient gain compared to non-IC.

The UE may also use a PCI-range approach. In the PCI-range approach, cells may broadcast a list of PCI ranges from which the UE is suppose to peel off when performing RSSI computations. In some embodiments, the CSG PCI range may already be provided and may be reused. In a macro-pico design, cells may provide PCI ranges of macros with which pico is partitioning resources. The UE may remove interference from these cells, for example, when computing RSSI of pico.

Figure 9:
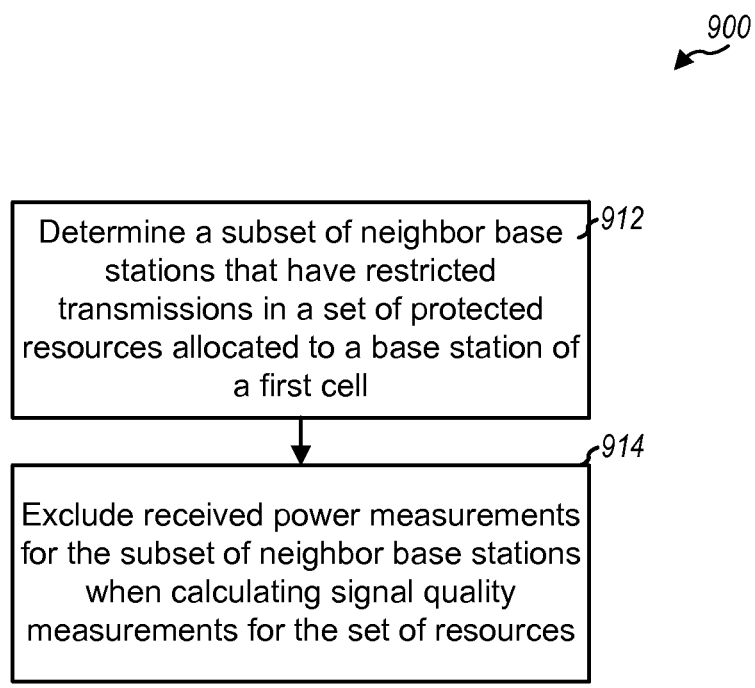
FIG. 9 illustrates example operations that may be performed by a UE, in accordance with certain aspects of the present disclosure.

FIG. 9 illustrates example operations 900 that may be performed, for example, by a UE while computing RSSI.

At 912, the UE may determine a subset of neighbor base stations that have restricted transmissions in a set of protected resources allocated to a base station of a first cell. For example, the UE may determine, based on RPI, neighbor base stations with limited transmissions on protected (U) subframes.

At 914, the UE may exclude received power measurements for the subset of neighbor cell when calculating signal quality measurements for the set of resources. For example, in a protected subframe, the UE may peel off cells through CRS-IC or by removing corresponding RSRP from RSSI. UE may peel off interference from some of the neighbor cells when computing RSSI.

As described herein, for RSRQ estimation, if SRPI of neighbor cells are known, a UE may subtract energy from neighbor cells whose subframes used for measurement are marked "N". Since N are not used for transmission, RSRQ evaluated according to the new definition takes into consideration protection stemming from TDM partitioning. The fact that no data is transmitted on "N" subframes, but reference symbols are may be take into account through suitable IC techniques, such as IC-based RSRQ measurements. RSRP measured on neighbor cell may also be used to assess RSSI (thus RSRQ) of a target cell, again utilizing interference cancellation. Other cell measurement options may also be available. For example, a UE may use U subframes of the target cell, if SRPI is known or may use U or N subframes of a serving cell, if SRPI of target cell is unknown.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a set of protected resources, allocated to a first base station, that are protected by restricting transmissions of an interfering base station;
   identifying the interfering base station prohibited from transmitting data in the set of protected resources;
   estimating interference due to a second reference signal from the interfering base station in the set of protected resources;
   subtracting the estimated interference from a received signal to obtain an interference-canceled signal; and
   measuring received power of a first reference signal from the first base station in the set of protected resources, wherein the measuring is based on the interference-canceled signal.

2. The method of claim 1, further comprising:
   determining reference signal received power (RSRP) of the first base station based on the received power of the first reference signal.

3. The method of claim 1, further comprising:
   measuring total received power in the set of protected resources; and
   determining received quality of the first reference signal from the first base station based on the received power of the first reference signal and the total received power in the set of protected resources.

4. The method of claim 3, further comprising:
   determining reference signal received quality (RSRQ) of the first base station based on the received quality of the first reference signal.

5. The method of claim 3, further comprising:
   estimating received power of the second reference signal from the interfering base station in the set of protected resources; and subtracting the received power of the second reference signal from the total received power in the set of protected resources to obtain a modified total received power, wherein the received quality of the first reference signal is determined based on the modified total received power.

6. The method of claim 5, wherein subtracting the received power of the second reference signal is implicitly carried out by means of cancellation of a cell reference signal (CRS) of the interfering base station from the signal used to compute the total received power.

7. The method of claim 5, wherein the received quality of the first reference signal is determined as follows $$RSRQ = \frac{N_{RB} * RSRP \text{ of Target } BS}{RSSI - RSRP \text{ of Interfering } BS},$$

where RSRP of Target BS is the received power of the first reference signal,

RSRP of Interfering BS is the received power of the second reference signal,

RSSI is the total received power in the set of protected resources,

RSRQ is the received quality of the first reference signal, and $N_{RB}$ is number of resource blocks used for measuring RSSI.

8. The method of claim 1, further comprising:
receiving resource partitioning information (RPI) for the interfering base station; and
determining that the interfering base station is prohibited from transmitting data in the set of protected resources based on the RPI for the interfering base station.

9. The method of claim 1, wherein:
the set of protected resources comprises a first subset of subframes allocated to the first base station indicated by resource partitioning information (RPI), in which transmissions from the first base station are protected by restricting transmissions from the interfering base station.

10. The method of claim 1, wherein the set of protected resources comprises at least one of a subband or a set of resource blocks (RBs).

11. A method for wireless communication by a user equipment (UE), comprising:
determining a subset of neighbor base stations that have restricted transmissions in a set of protected resources allocated to a first base station; and
excluding received power measurements for the subset of neighbor base stations when calculating received signal quality measurements for the set of protected resources, wherein excluding received power measurements for the subset of neighbor base stations when calculating received signal quality measurements for the set of protected resources comprises at least one of excluding received power measurements for the subset of neighbor base stations from received signal strength calculations or performing cell reference signal (CRS) interference cancellation for a CRS transmitted by the subset of neighbor base stations before computing the received signal quality.

12. The method of claim 11, wherein the determining comprises:
receiving resource partitioning information (RPI) indicating the subset of neighbor base stations that cause reduced interference (due to transmission restrictions) in the set of protected resources.

13. The method of claim 12, wherein:
the set of protected resources comprises a first subset of subframes allocated to a base station indicated by the RPI, in which transmissions from the first base station are protected by restricting transmissions from the neighbor base stations.

14. The method of claim 11, wherein the set of protected resources comprises at least one of a subband or a set of resource blocks (RBs).

15. The method of claim 11, wherein the determining comprises:
determining the subset of neighbor base stations based on received signals transmitted from the neighbor base stations.

16. The method of claim 11, wherein the determining comprises:
determining one or more neighboring base stations corresponding to cells that are members of a closed subscriber group (CSG).

17. The method of claim 11, wherein the determining comprises:
determining one or more neighboring base stations for which interference cancelation (IC) provides sufficient gain compared to non-IC.

18. The method of claim 11, wherein the determining comprises:
determining one or more neighboring base stations for which the UE was able to successfully detect basic synchronization signals.

19. The method of claim 18, wherein the determining comprises:
using the knowledge about cell reference signal (CRS) locations of each neighbor base station with respect to a CRS location of the UE's serving base station, to decide whether or not to include a neighbor base station in the received signal quality calculation.

20. The method of claim 11, wherein the determining comprises:
receiving a broadcast list of physical cell identifiers (PCIs) indicating the subset of neighbor base stations.

21. The method of claim 11, wherein excluding received power measurements for the subset of neighbor base stations when calculating received signal quality measurements for the set of protected resources comprises excluding reference signal received power (RSRP) measurements for the subset of neighbor base stations.

22. An apparatus for wireless communication, comprising:
means for determining a set of protected resources, allocated to a first base station, that are protected by restricting transmissions of an interfering base station;
means for identifying the interfering base station prohibited from transmitting data in the set of protected resources;
means for estimating interference due to a second reference signal from the interfering base station in the set of protected resources;
means for subtracting the estimated interference from a received signal to obtain an interference-canceled signal; and
means for measuring received power of a first reference signal from the first base station in the set of protected resources, wherein the measuring is based on the interference-canceled signal.

23. The apparatus of claim 22, further comprising:
means for determining reference signal received power (RSRP) of the first base station based on the received power of the first reference signal.

24. The apparatus of claim 22, further comprising:
means for measuring total received power in the set of protected resources; and
means for determining received quality of the first reference signal from the first base station based on the received power of the first reference signal and the total received power in the set of protected resources.

25. The apparatus of claim 24, further comprising:
means for determining reference signal received quality (RSRQ) of the first base station based on the received quality of the first reference signal.

26. The apparatus of claim 24, further comprising:
means for estimating received power of the second reference signal from the interfering base station in the set of protected resources; and
means for subtracting the received power of the second reference signal from the total received power in the set of protected resources to obtain modified total received power,
wherein the received quality of the first reference signal is determined based on the modified total received power.

27. The apparatus of claim 26, wherein subtracting the received power of the second reference signal is implicitly carried out by means of cancellation of a cell reference signal (CRS) of the interfering base station from the signal used to compute the total received power.

28. The apparatus of claim 26, wherein the received quality of the first reference signal is determined as follows $$RSRQ = \frac{N_{RB} * RSRP \text{ of Target } BS}{RSSI - RSRP \text{ of Interfering } BS},$$

where RSRP of Target BS is the received power of the first reference signal,
RSRP of Interfering BS is the received power of the second reference signal,
RSSI is the total received power in the set of protected resources,
RSRQ is the received quality of the first reference signal, and
$N_{RB}$ is number of resource blocks used for measuring RSSI.

29. The apparatus of claim 22, further comprising:
means for receiving resource partitioning information (RPI) for the first base station; and
means for identifying the set of protected resources based on the RPI for the first base station.

30. The apparatus of claim 29, further comprising:
means for receiving RPI for the interfering base station; and
means for determining that the interfering base station is prohibited from transmitting data in the set of protected resources based on the RPI for the interfering base station.

31. The apparatus of claim 29, wherein:
the set of protected resources comprises a first subset of subframes allocated to the first base station indicated by the RPI, in which transmissions from the first base station are protected by restricting transmissions from the interfering base station.

32. The apparatus of claim 22, wherein the set of protected resources comprises at least one of a subband or a set of resource blocks (RBs).

33. An apparatus for wireless communication, comprising:
means for determining a subset of neighbor base stations that have restricted transmissions in a set of protected resources allocated to a first base station; and
means for excluding received power measurements for the subset of neighbor base stations when calculating received signal quality measurements for the set of protected resources, wherein the means for excluding received power measurements for the subset of neighbor base stations when calculating received signal quality measurements for the set of protected resources comprises at least one of means for excluding received power measurements for the subset of neighbor base stations from received signal strength calculations or means for performing cell reference signal (CRS) interference cancellation for a CRS transmitted by the subset of neighbor base stations before computing the received signal quality.

34. The apparatus of claim 33, wherein the determining comprises:
means for receiving resource partitioning information (RPI) indicating the subset of neighbor base stations that cause reduced interference (due to transmission restrictions) in the set of protected resources.

35. The apparatus of claim 34, wherein:
the set of protected resources comprises a first subset of subframes allocated to the first base station indicated by the RPI, in which transmissions from the first base station are protected by restricting transmissions from the neighbor base stations.

36. The apparatus of claim 33, wherein the set of protected resources comprises at least one of a subband or a set of resource blocks (RBs).

37. The apparatus of claim 33, wherein the means for determining comprises:
means for determining the subset of neighbor base stations based on received signals transmitted from the neighbor base stations.

38. The apparatus of claim 33, wherein the means for determining comprises:
means for determining one or more neighboring base stations corresponding to cells that are members of a closed subscriber group (CSG).

39. The apparatus of claim 33, wherein the means for determining comprises:
means for determining one or more neighboring base stations for which interference cancelation (IC) provides sufficient gain compared to non-IC.

40. The apparatus of claim 33, wherein the means for determining comprises:
means for determining one or more neighboring base stations for which UE was able to successfully detect basic synchronization signals.

41. The apparatus of claim 40, wherein the means for determining comprises:
means for using the knowledge about cell reference signal (CRS) locations of each neighbor base station with respect to a CRS location of the apparatus's serving base station, to decide whether or not to include a neighbor base station in the received signal quality calculation.

42. The apparatus of claim 33, wherein the means for excluding received power measurements for the subset of neighbor base stations when calculating received signal quality measurements for the set of protected resources comprises means for excluding reference signal received power (RSRP) measurements for the subset of neighbor base stations.

43. An apparatus for wireless communication, comprising:
- at least one processor configured to:
    - determine a set of protected resources, allocated to a first base station, that are protected by restricting transmissions of an interfering base station;
    - identify the interfering base station prohibited from transmitting data in the set of protected resources;
    - estimate interference due to a second reference signal from the interfering base station in the set of protected resources;
    - subtract the estimated interference from a received signal to obtain an interference-canceled signal; and
    - measure received power of a first reference signal from the first base station in the set of protected resources, wherein the measuring is based on the interference-canceled signal; and
- a memory coupled with the at least one processor.

44. An apparatus for wireless communication, comprising:
- at least one processor configured to determine a subset of neighbor base stations that have restricted transmissions in a set of protected resources allocated to a first base station and exclude received power measurements for the subset of neighbor base stations when calculating received signal quality measurements for the set of protected resources, wherein at least one processor is configured to exclude received power measurements for the subset of neighbor base stations when calculating received signal quality measurements for the set of protected resources by at least one of excluding received power measurements for the subset of neighbor base stations from received signal strength calculations or performing cell reference signal (CRS) interference cancellation for a CRS transmitted by the subset of neighbor base stations before computing the received signal quality; and
- a memory coupled with the at least one processor.

45. A non-transitory computer readable medium with instructions stored thereon, the instructions executable by one or more processors for:
- determining a set of protected resources, allocated to a first base station, that are protected by restricting transmissions of an interfering base station;
- identifying the interfering base station prohibited from transmitting data in the set of protected resources;
- estimating interference due to a second reference signal from the interfering base station in the set of protected resources;
- subtracting the estimated interference from a received signal to obtain an interference-canceled signal; and
- measuring received power of a first reference signal from the first base station in the set of protected resources, wherein the measuring is based on the interference-canceled signal.

46. A non-transitory computer readable medium with instructions stored thereon, the instructions executable by one or more processors for:
- determining a subset of neighbor base stations that have restricted transmissions in a set of protected resources allocated to a first base station; and
- excluding received power measurements for the subset of neighbor base stations when calculating received signal quality measurements for the set of protected resources, wherein excluding received power measurements for the subset of neighbor base stations when calculating received signal quality measurements for the set of protected resources comprises at least one of excluding received power measurements for the subset of neighbor base stations from received signal strength calculations or performing cell reference signal (CRS) interference cancellation for a CRS transmitted by the subset of neighbor base stations before computing the received signal quality.

* * * * *